(12) United States Patent
Kramer

(10) Patent No.: US 7,510,353 B2
(45) Date of Patent: Mar. 31, 2009

(54) INDEXABLE CUTTING TOOL INSERT AND CUTTING TOOL

(75) Inventor: Rodney M. Kramer, Rockford, IL (US)

(73) Assignee: Remark Technologies, Inc., Rockford, IL (US)

( * ) Notice: Subject to any disclaimer, the term of this patent is extended or adjusted under 35 U.S.C. 154(b) by 0 days.

(21) Appl. No.: 11/355,448

(22) Filed: Feb. 16, 2006

(65) Prior Publication Data

US 2007/0189860 A1  Aug. 16, 2007

(51) Int. Cl.
*B23C 5/20* (2006.01)
*B23C 1/00* (2006.01)

(52) U.S. Cl. .............................. 407/113; 407/66; 407/30

(58) Field of Classification Search .................... 407/42, 407/113–117, 33, 101, 66, 67, 30
See application file for complete search history.

(56) References Cited

U.S. PATENT DOCUMENTS

| | | | |
|---|---|---|---|
| 3,662,444 A | 5/1972 | Erkfritz | |
| 3,701,187 A | 10/1972 | Erkfritz | |
| 3,716,900 A | 2/1973 | Erkfritz | |
| 4,898,500 A | 2/1990 | Nakamura et al. | |
| 5,667,343 A | 9/1997 | Hessman et al. | |
| 5,707,185 A | 1/1998 | Mizutani | |
| 5,712,030 A | 1/1998 | Goto et al. | |
| 5,752,155 A | 5/1998 | Gates, Jr. et al. | |
| 5,762,453 A | 6/1998 | Arai et al. | |
| 5,809,848 A | 9/1998 | Viswanadham et al. | |
| 5,924,824 A * | 7/1999 | Satran et al. | 407/34 |
| 5,976,707 A | 11/1999 | Grab | |
| 6,161,990 A | 12/2000 | Oles et al. | |
| 6,503,028 B1 | 1/2003 | Wallström | |
| 6,540,448 B2 | 4/2003 | Johnson | |
| 6,607,335 B2 | 8/2003 | Morgulis | |
| 6,709,205 B2 | 3/2004 | Morgulis et al. | |
| 6,742,969 B1 | 6/2004 | Hoefler | |
| 6,769,844 B2 | 8/2004 | Waggle | |
| 6,773,209 B2 | 8/2004 | Craig | |

(Continued)

OTHER PUBLICATIONS

Ingersoll, excerpt from Ingersoll Face Mills Catalog, pp. 3, 4, 6, 7, 10-13.

(Continued)

*Primary Examiner*—Willmon Fridie
(74) *Attorney, Agent, or Firm*—Fitch, Even, Tabin & Flannery

(57) ABSTRACT

An insert for use in a cutting tool having two truncated, wedge-shaped faces, and at least two edge surfaces. The insert also has a retainer hole extending through the insert at a predetermined angle to accommodate an insert retainer. The insert is indexable by repositioning the cutting insert from one face to the other face. The inserts are disposed in a plurality of circumferentially-spaced seats about a working end of a cutting tool body. Each seat has a major seating surface for mounting the insert and for receiving a retainer at a predetermined angle. The seat also has a minor seating surface oriented to engage an edge surface of the insert and to reduce the shear force against the retainer during rotation of the tool body. The tool body has angled chip pockets, resulting in more inserts per cutting tool diameter and a greater cross-sectional tool body.

35 Claims, 9 Drawing Sheets

U.S. PATENT DOCUMENTS

| | | |
|---|---|---|
| 6,851,897 B2 | 2/2005 | Kubo |
| 6,921,233 B2 | 7/2005 | Duerr et al. |
| 6,926,472 B2 | 8/2005 | Arvidsson |
| 6,929,428 B1 | 8/2005 | Wermeister et al. |
| 6,929,429 B2 | 8/2005 | Riviére |
| 6,942,431 B2 | 9/2005 | Pantzar et al. |
| 6,960,049 B2 | 11/2005 | Inayama |
| 6,960,051 B2 * | 11/2005 | Koskinen .................... 409/234 |
| 2002/0028116 A1 | 3/2002 | Morgulis |
| 2003/0103818 A1 | 6/2003 | Astrom |
| 2003/0113173 A1 | 6/2003 | Pantzar et al. |
| 2003/0223829 A1 | 12/2003 | Craig |
| 2004/0081522 A1 | 4/2004 | Kubo |
| 2004/0131432 A1 | 7/2004 | Riviere |
| 2004/0208714 A1 | 10/2004 | Stabel et al. |
| 2004/0213639 A1 | 10/2004 | Ueda et al. |
| 2004/0223818 A1 | 11/2004 | Sheffler et al. |
| 2004/0237723 A1 | 12/2004 | Kanada et al. |
| 2004/0258488 A1 | 12/2004 | Koskinen |

OTHER PUBLICATIONS

Ingersoll, excerpt from Ingersoll End Mills Catalog, pp. 3-5, 11-13, 18-19.

* cited by examiner

INDEXABLE CUTTING TOOL INSERT AND CUTTING TOOL

FIELD OF THE INVENTION

The present invention relates to an insert mounted on a cutting tool body and also relates to a cutting tool on which the insert is mounted.

BACKGROUND OF THE INVENTION

Cutting inserts are used in various cutting tools for the machining of workpieces, particularly metallic workpieces. Indexable cutting inserts, formed from material such as sintered carbides or ceramics, are often used in milling operations, such as machining aluminum, cast iron, steel, stainless steel, nickel based alloys, cobalt alloys, and titanium. Examples of cutting tools that employ inserts in performing milling operations include face mills, end mills and slotters.

In some conventional cutting tools, indexable cutting inserts are removably secured in insert seats disposed within pockets and spaced circumferentially around the outer periphery of a tool body. Conventional inserts may have a cutting edge about the outside of the insert, which provides a number of alternately usable cutting edges. In some cutting tools, a polygonal insert has been employed to make effective use of its corners.

Ordinarily, during a cutting operation, only a portion of the cutting edge actually cuts the workpiece. When one cutting position becomes worn, the insert may be "indexed," or repositioned, in the seat in order to bring a fresh cutting edge into the active cutting position. When all of the cutting positions are worn, the insert is discarded and replaced with a new one. In such conventional cutting tools, inserts are generally indexed by rotating them in their respective insert seats about an axis defined by the retainer hole to expose a different cutting edge.

The tool body of a conventional cutting tool often has a circular working end and a plurality of pockets, and chip gullets, positioned about the outside circumference of the working end, and each station contains a seating surface for mounting a cutting insert. An insert seat ordinarily includes one or more seating surfaces for locating, positioning, and orienting the insert in the pocket. One of many methods of retention is a common screw, which passes through a retainer hole in each insert and is threaded into a threaded mounting hole in a seating surface to retain the insert in the pocket. Each chip pocket forms a recess, or indentation, in the tool body located between adjacent insert seats. The chip pockets provide clearance regions for chips cut during the operation of the cutting tool.

A conventional threaded hole is generally perpendicular or slightly angled to the broad top and bottom faces of the insert and to the seating surface supporting the bottom face. During cutting of the workpiece, the inserts commonly experience forces that act to tend to cause the insert to be ejected from the insert pocket. The retainer fastener is the primary means by which the insert is retained in the seat. As a result, the retainer is subject to a shear force that can result in the breaking of the retainer.

In addition, the orientation of the retainer in the insert seat requires the removal of a significant amount of the cutting tool body in front of the insert seat. More specifically, the retainer is oriented approximately perpendicular to the face of the major seating surface, i.e., the seating surface in contact with the bottom face of the insert. As a result, a significant amount of the cutting tool body in front of each major seating surface must be removed to allow the retainer to be screwed in and out of the major seating surface. The removal of this cutting tool body material makes the cross-section smaller, thereby weakening it and shortening its useful life.

Thus, there is a need for an improved cutting insert and an improved cutting tool body. There is a need for a cutting insert having a geometry that decreases the shear force on the retainer and that allows the insert to be mounted in the insert seat more securely. Also, there is a need for a cutting tool body having a cooperating geometry that decreases the shear force on the retainer and that holds the inserts in the pockets more securely. Further, there is a need for a stronger, thicker cross-section cutting tool body allowing smaller chip pockets, if desired, improved cutting ability, increased strength, and a longer useful life.

DESCRIPTION OF THE PREFERRED EMBODIMENTS

There is a need for a cutting insert and cutting tool body having different geometries than conventional cutting inserts and tool bodies. Such geometries allow the indexing of the insert in an unconventional manner, thereby allowing the insert to be retained in an insert seat in a more secure manner. With respect to the cutting tool body, the tool body is configured to retain the inserts more securely in their seats and to allow the reduction in the size of the chip pockets between adjacent insert seats. These features are readily seen by comparing a conventional rectangular insert and cutting tool body to an insert and tool body having features of the embodiments discussed below.

Figure 1:
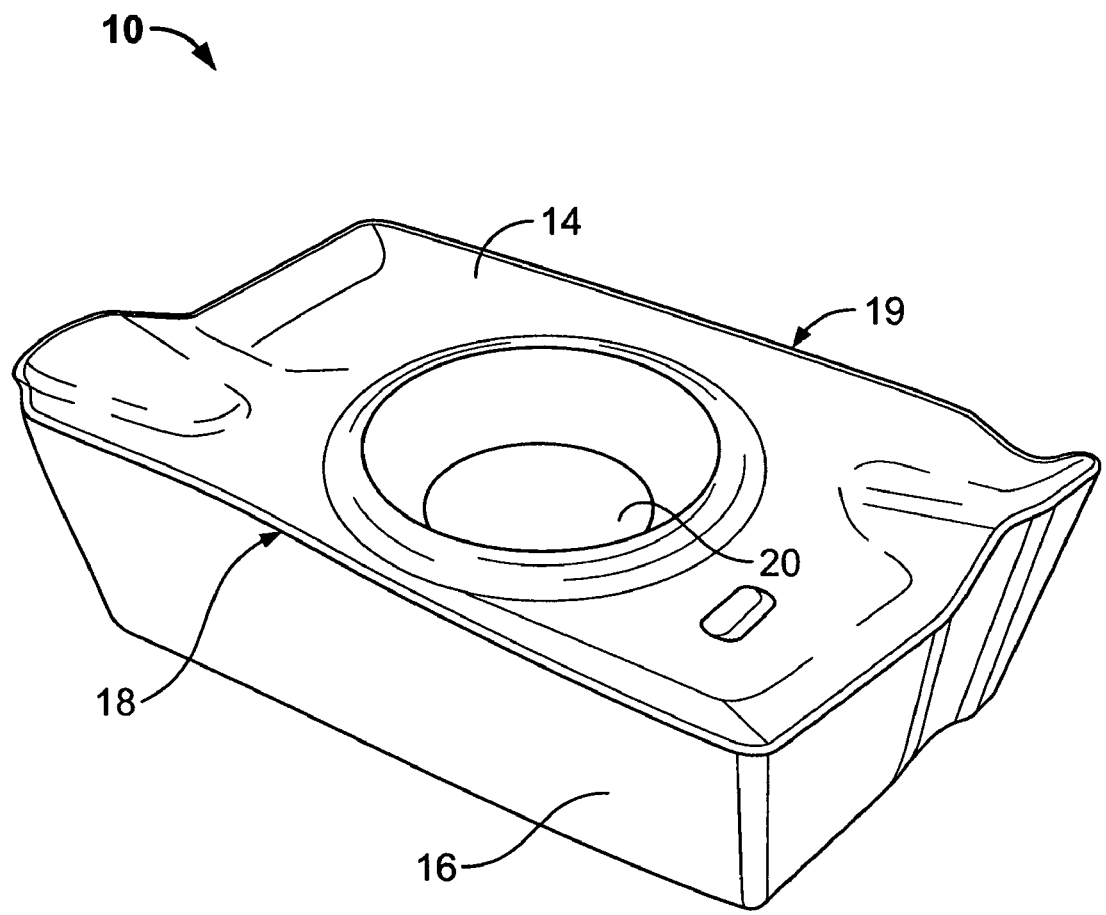
FIG. 1 is a perspective view of a prior art cutting insert.
Figure 10:
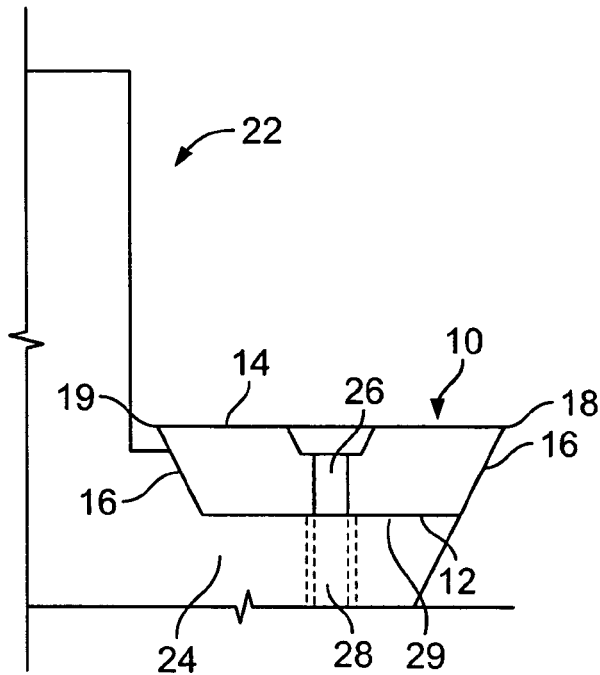
FIG. 10 is a schematic view of a prior art chip pocket and insert.

FIGS. 1 and 10 show a conventional polygonal insert 10, which is commonly used in conventional cutting tools. As seen in FIGS. 1 and 10, a conventional positive geometry insert 10 has a bottom geometric seating surface 12, which has elements that are essentially parallel to a top geometric surface 14 and has a smaller area than the top surface 14. The conventional insert 10 also includes edge surfaces, or side seating surfaces, 16 such that a cross-section of the insert 10, as shown in FIG. 10, is in the approximate shape of a trapezoid. Further, as shown in FIG. 1, the conventional insert 10 has two cutting edges 18 and 19, which are defined by the intersection of the side seating surfaces 16 with the top surface 14. In addition, the conventional insert 10 has a retainer hole 20 extending through the insert 10 such that the axis of the retainer hole 20 is perpendicular to the bottom face 12.

As can be seen from FIGS. 1 and 10, when a portion of one cutting edge 18 becomes worn, the insert 10 may be rotated about hole 20 to allow the second unworn cutting edge 19 to be used during operation of the cutting tool. Thus, with respect to conventional inserts 10, the insert 10 is commonly "indexed," i.e., repositioned so that an unworn cutting edge is placed in the active cutting position, by rotating the insert 10 about the retainer hole axis. When the second cutting edge 19 also becomes worn, the conventional insert is ordinarily discarded and replaced with an unused insert 10. As can be seen in FIG. 10, because the insert 10 is rotated about the retainer hole axis, the insert 10 remains supported by the bottom geometric seating surface 12 both before and after indexing, and a side seating surface 16 positions the insert 10 in the pocket 22.

Figure 2:
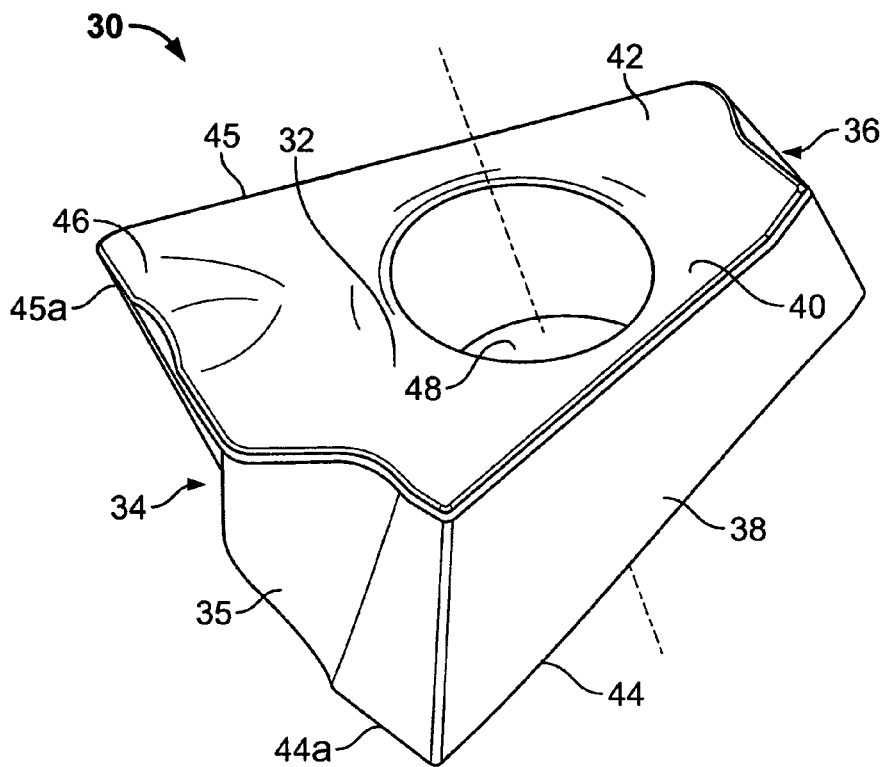
FIG. 2 is a perspective view of a first embodiment of the cutting insert of the present invention for positive geometry cutting.
Figure 3:
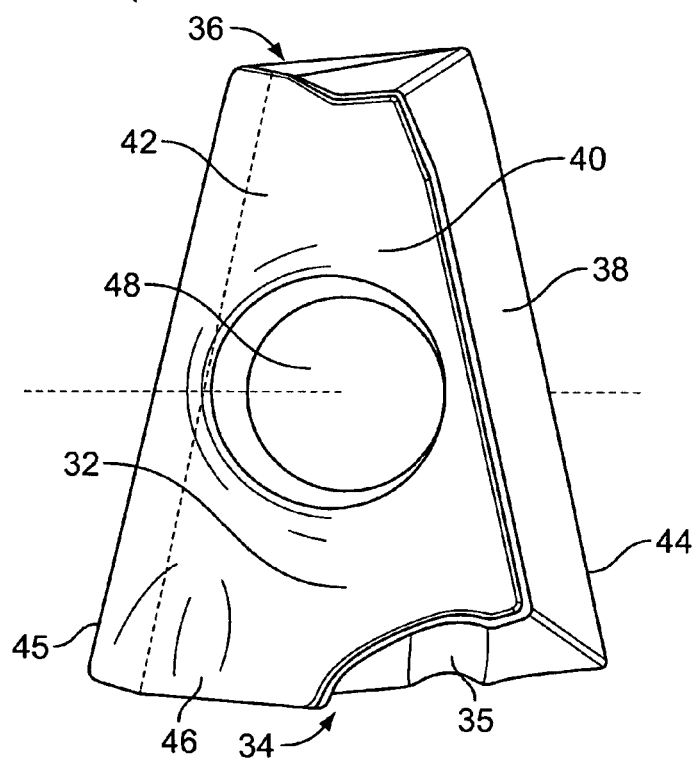
FIG. 3 is a top plan view of the embodiment of the cutting insert shown in FIG. 2.
Figure 4:
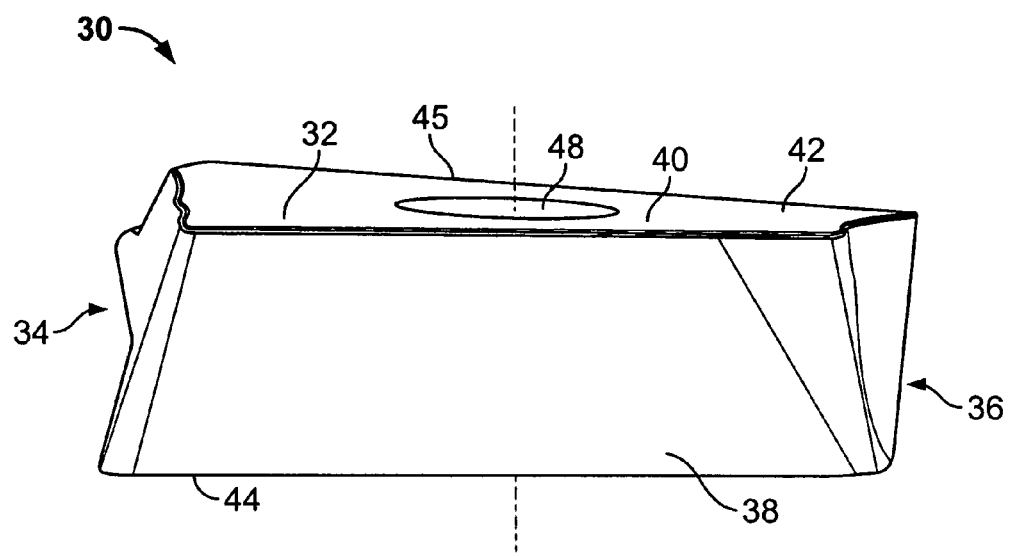
FIG. 4 is a side elevational view of the embodiment of the cutting insert shown in FIG. 2.
Figure 11:
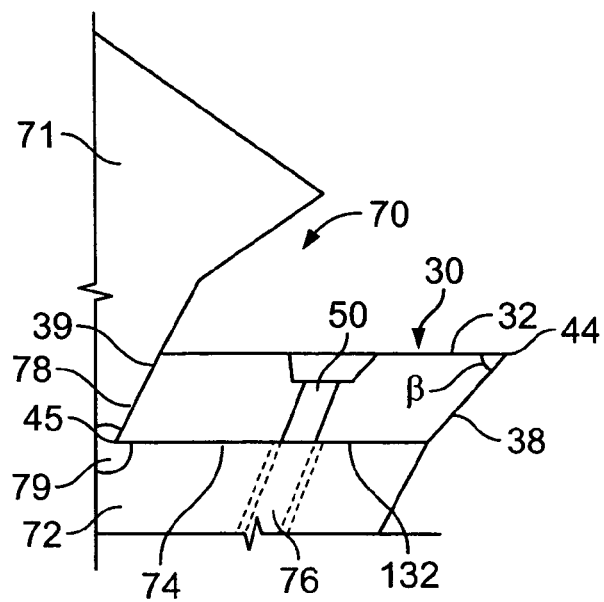
FIG. 11 is a schematic view of an embodiment of the chip pocket and insert of the present invention.

FIGS. 2-5 show a first embodiment of a cutting tool insert 30. The insert 30 is a positive geometry insert composed of a block of hard metal that acts as a suitable cutting material, such as tungsten carbide. As can be seen in FIGS. 2, 3, and 11, the insert 30 has two opposed major faces 32 and 132, which are substantially parallel to one another and substantially identical in shape and area. Each opposed major face 32 or 132 has a truncated pie shape, in which each face 32 or 132 has a broad end 34 that tapers to a narrow end 36.

Figure 5:
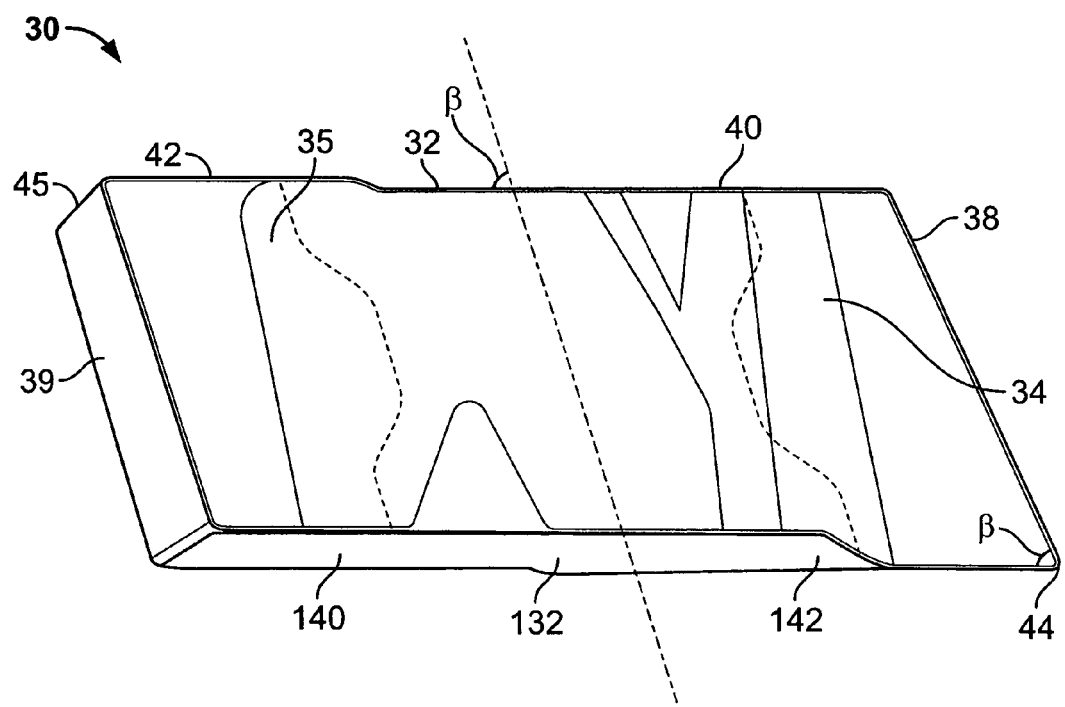
FIG. 5 is a front elevational view of the embodiment of the cutting insert shown in FIG. 2.
Figure 6:
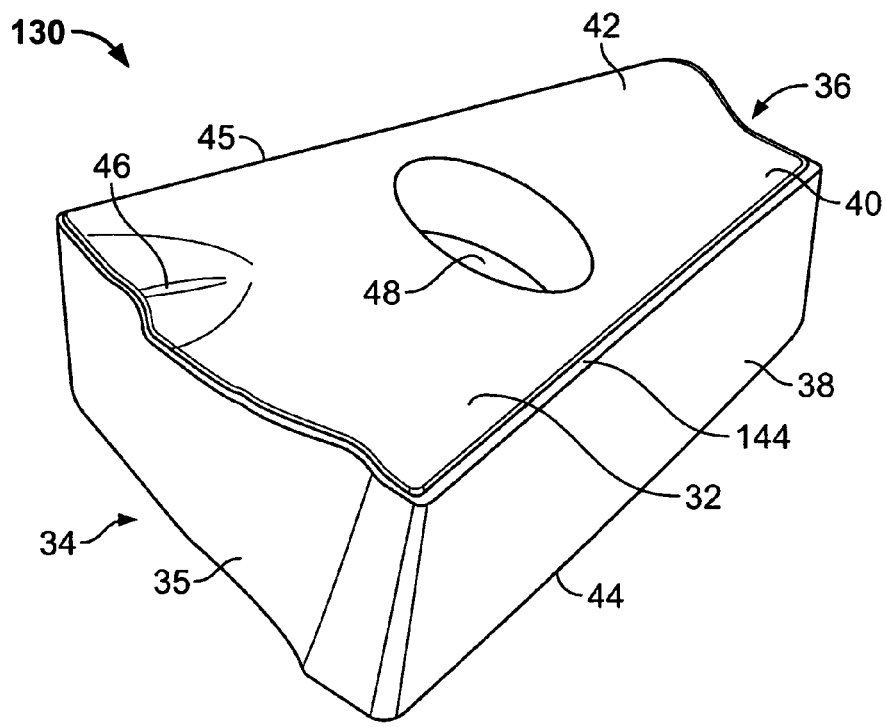
FIG. 6 is a perspective view of a second embodiment of the cutting insert of the present invention for negative geometry cutting.

As can be seen in FIGS. 2, 3, and 11, the insert 30 has first and second edge surfaces, or side seating surfaces, 38 and 39 that form the sides of the insert 30 and that diverge from the broad end 34 of the insert 30 to the narrow end 36. The first and second side seating surfaces 38 and 39 act as clearance faces for rotary cutting action during the machining process. The first and second side seating surfaces 38 and 39 are oriented such that a cross-section of the insert 30, as shown in FIGS. 5 and 11, is substantially in the shape of a parallelogram, when viewed from either the broad end 34 or the narrow end 36. As shown in FIGS. 5 and 11, the side seating surfaces 38 and 39 define a predetermined acute angle β formed by their intersection with the opposed major faces 32 and 132. The angle β may be virtually any angle between 0° and 90°, as desired or as dictated by the nature of the work.

As shown in FIGS. 2, 3, and 5, each opposed major face 32 or 132 is preferably divided into two or more portions: a planar surface 40 or 140 for seating in the pocket and a rake surface 42 or 142 for cutting action and chip control. The surfaces are preferably separated from one another by a plane bisecting the narrow and broad ends 34 and 36 of the insert 30. This bisecting plane preferably divides each opposed major face 32 or 132 approximately in half.

In the first embodiment, each insert 30 includes two cutting edges—a first cutting edge 44 and a second cutting edge 45. As shown in FIGS. 2-5 and 11, the cutting edges 44 and 45 are formed by the intersection of the side seating surfaces 38 and 39 with rake surfaces 42 and 142 of each opposed major face 32 or 132. As shown in FIGS. 5 and 11, the intersection of side seating surfaces 38 and 39 and rake surfaces 42 forms acute angle β. The rake surfaces 42 and 142 preferably have one or more sculptured portions 46 to assist in chip removal and chip breaking during cutting tool operation, as shown in FIGS. 2 and 3. Further, as shown in FIG. 2, the cutting edges 44 and 45 each wrap around the corners at the broad end 34 of the insert 30 in a smooth geometric form, i.e., radius or chamfer, into cutting edge portions 44a and 45a, respectively, and end in a depression central to the broad end 34. The corner geometry at the broad end 34 may be selected to make the corners to a specific geometric shape to accommodate the dimensions of the workpiece being cut.

The cutting edges 44 and 45 therefore are not situated on the same face, or top surface, as in conventional positive geometry inserts shown in FIGS. 1 and 10. The insert 30 therefore is not indexed by simply rotating the insert 30 about a retainer hole axis. Instead, the insert 30 is indexable by "flipping over" the insert, i.e., by repositioning the insert from one opposed major face 32 to the other opposed major face 132, as can be seen from FIG. 11.

As shown in FIGS. 2, 3 and 5, the broad end 34 of the insert 30 is preferably indented between side seating surfaces 38 and 39 to cause the rake surfaces 42 and 142, the cutting edges 44 and 45, and cutting edge portions 44a and 45a to project from the broad end 34. The indented portion 35 of the broad end 34 makes the corners prominent and allows the insert 30 to make effective use of the corners of the insert 30 during operation of the cutting tool. The indented portion 35 also acts as a clearance region during operation of the cutting tool in rotary motion.

As shown in FIGS. 2, 3, 5, and 11, a retainer hole 48 is located in substantially the center of each opposed major face 32 or 132 to allow passage of an insert retainer 50 therethrough, preferably in the form of a retainer screw or other fastening method. The retainer hole 48 extends through the body of the insert 30 from one opposed face 32 to the other face 132 and permits the insert 30 to be mounted to the cutting tool body. As shown in FIGS. 2, 3, and 5, the retainer hole 48 is angled so that the axis of the retainer hole 48 is not perpendicular to the opposed faces 32 and 132. Instead, as shown in FIGS. 3 and 11, the axis defined by the retainer hole 48 is preferably parallel to the non-perpendicular side seating surfaces 38 and 39, i.e., the axis preferably intersects the opposed major faces 32 and 132 to define the same acute angle, β, described above.

FIGS. 6-9 show a second embodiment of the insert 130 having some features that are similar to those of the first embodiment. The second embodiment has two truncated pie-shaped opposed major faces 32 and 132, which are each divided into planar surfaces 40 and 140 and rake surfaces 42 and 142. The second embodiment also has side seating surfaces 38 and 39, forming the sides of the truncated pie shape. Further, the second embodiment has a retainer hole 48 extending through the insert 130.

Figure 9:
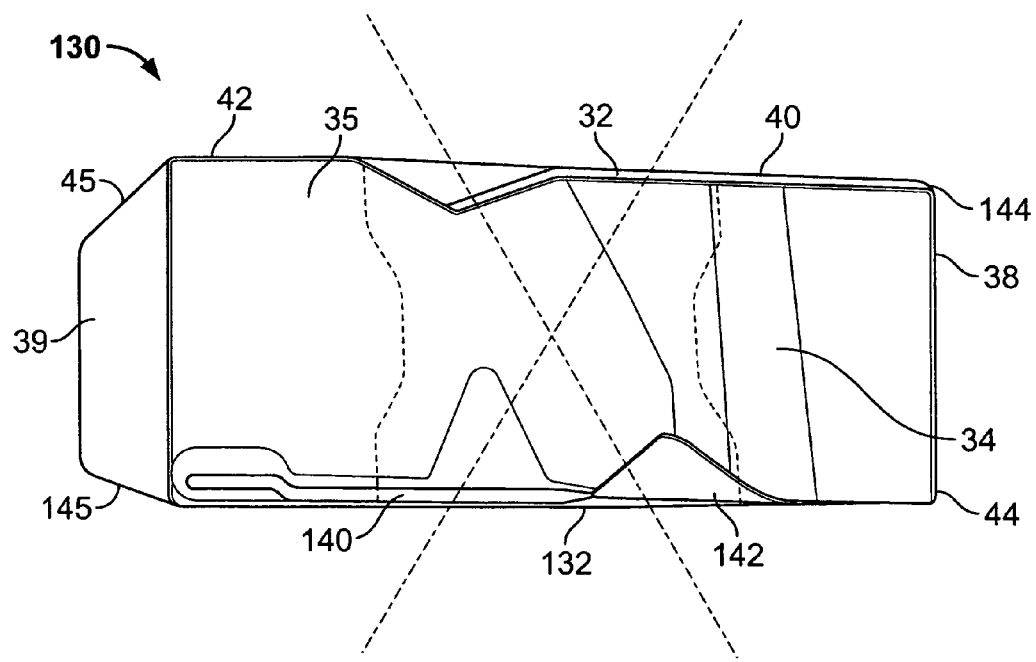
FIG. 9 is a front elevational view of the embodiment of the cutting insert shown in FIG. 6.

FIGS. 6-9 also show differences between the second embodiment and the first embodiment. For example, the second embodiment is a negative geometry insert in which the angle β, i.e., the angle formed by the intersection of the side seating surfaces 38 and 39 and the rake surfaces 42 and 142, is not an acute angle but is instead a ninety degree angle, as shown in FIG. 9. In other words, the side seating surfaces 38 and 39 are perpendicular to the rake surfaces 42 and 142, and a cross-section of the insert 130, when viewed from the broad end 34 or narrow end 36, is essentially in the shape of a rectangle, as shown in FIG. 9.

Figure 7:
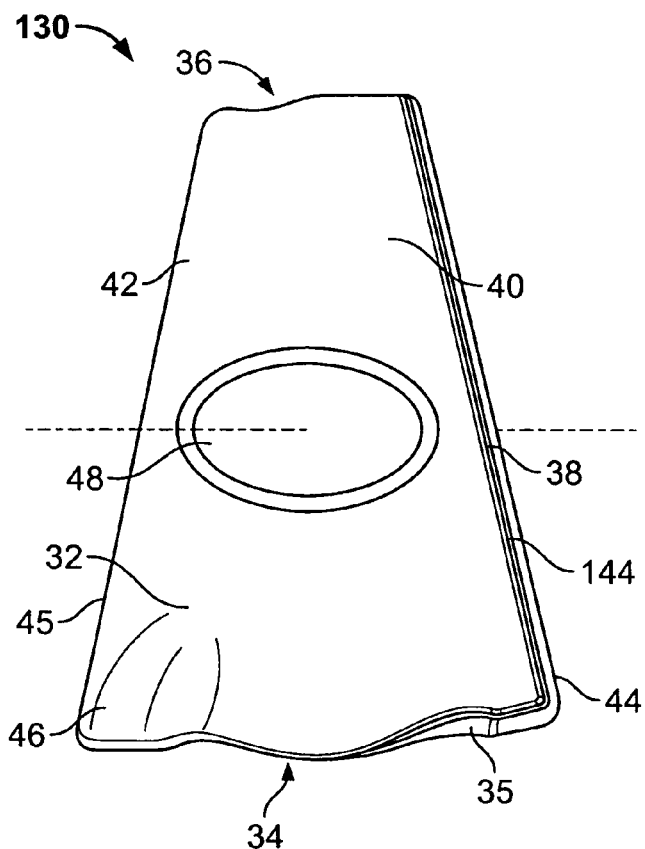
FIG. 7 is a top plan view of the embodiment of the cutting insert shown in FIG. 6.
Figure 8:
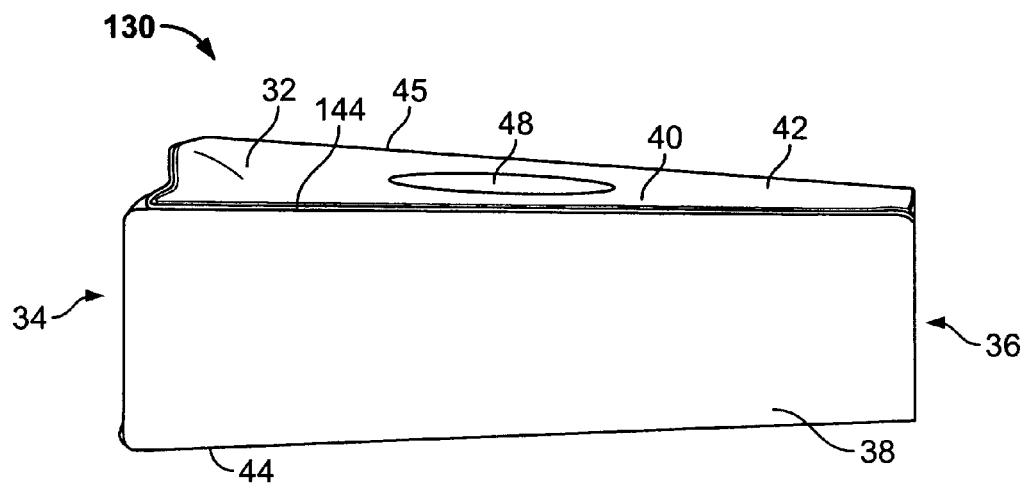
FIG. 8 is a side elevational view of the embodiment of the cutting insert shown in FIG. 6.

Further, the retainer hole 48 of the second embodiment is preferably elongated, as shown in FIG. 7. The elongated shape allows a retainer to be installed through the retainer hole 48 in one of two angled, non-perpendicular orientations.

The two orientations of the retainer with respect to the insert 130 allow the use of four cutting edges along the insert 130, instead of two cutting edges.

More specifically, as shown in FIG. 9, the second embodiment has a first cutting edge 44, a second cutting edge 45, a third cutting edge 144, and a fourth cutting edge 145. These cutting edges are formed by the intersection of the side seating surfaces 38 and 39 with the opposed major faces 32 and 132. When the negative geometry insert 130 is used with a cutting tool that rotates in one direction, i.e., clockwise, the insert 130 is indexable between the first and second cutting edges 44 and 45 such that one is in the active cutting position. When both the first and second cutting edges 44 and 45 are worn, the insert 130 may be used with a cutting tool configured to rotate in the opposite direction, i.e., counterclockwise. When used with the latter cutting tool, the insert 130 is indexable such that the unworn third and fourth cutting edges 144 and 145 are alternately in the active cutting position.

The manner of indexing the second embodiment is the same as described above for the first embodiment. The insert 130 is indexed by "flipping over" the insert 30, not by rotating it about the retainer hole axis.

In the preferred embodiments of the positive and negative geometry inserts described herein, a screw 50 is used to retain the inserts 30 and 130. It should be evident, however, that other fastening methods are also available for use in retaining inserts 30 and 130. For example, and without limitation, clamps, wedges, cams, and cam-pins may also be used to hold the inserts 30 and 130 in place.

Figure 12:
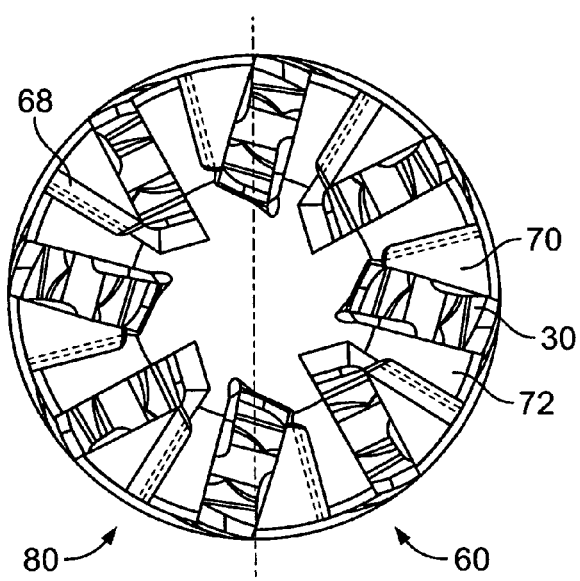
FIG. 12 is a front elevational view of a first embodiment of a cutting tool of the present invention.
Figure 13:
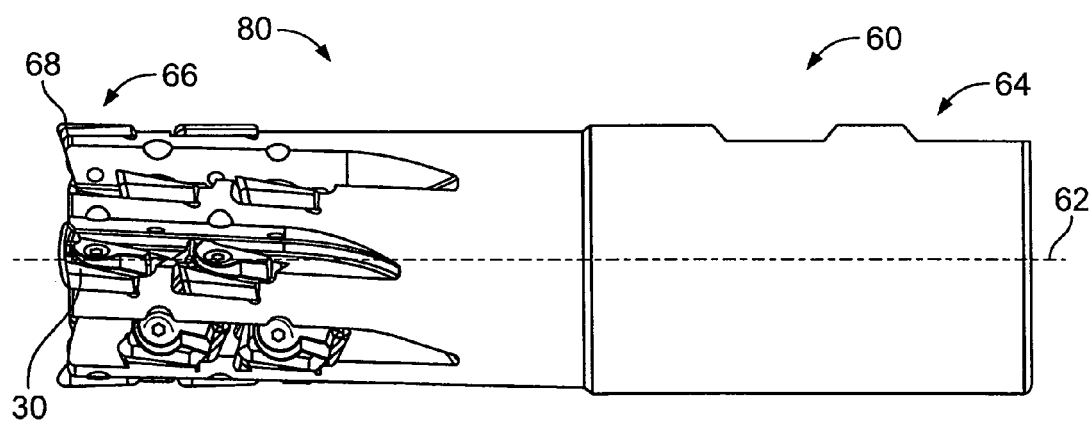
FIG. 13 is a side elevational view of the cutting tool shown in FIG. 12.
Figure 14:
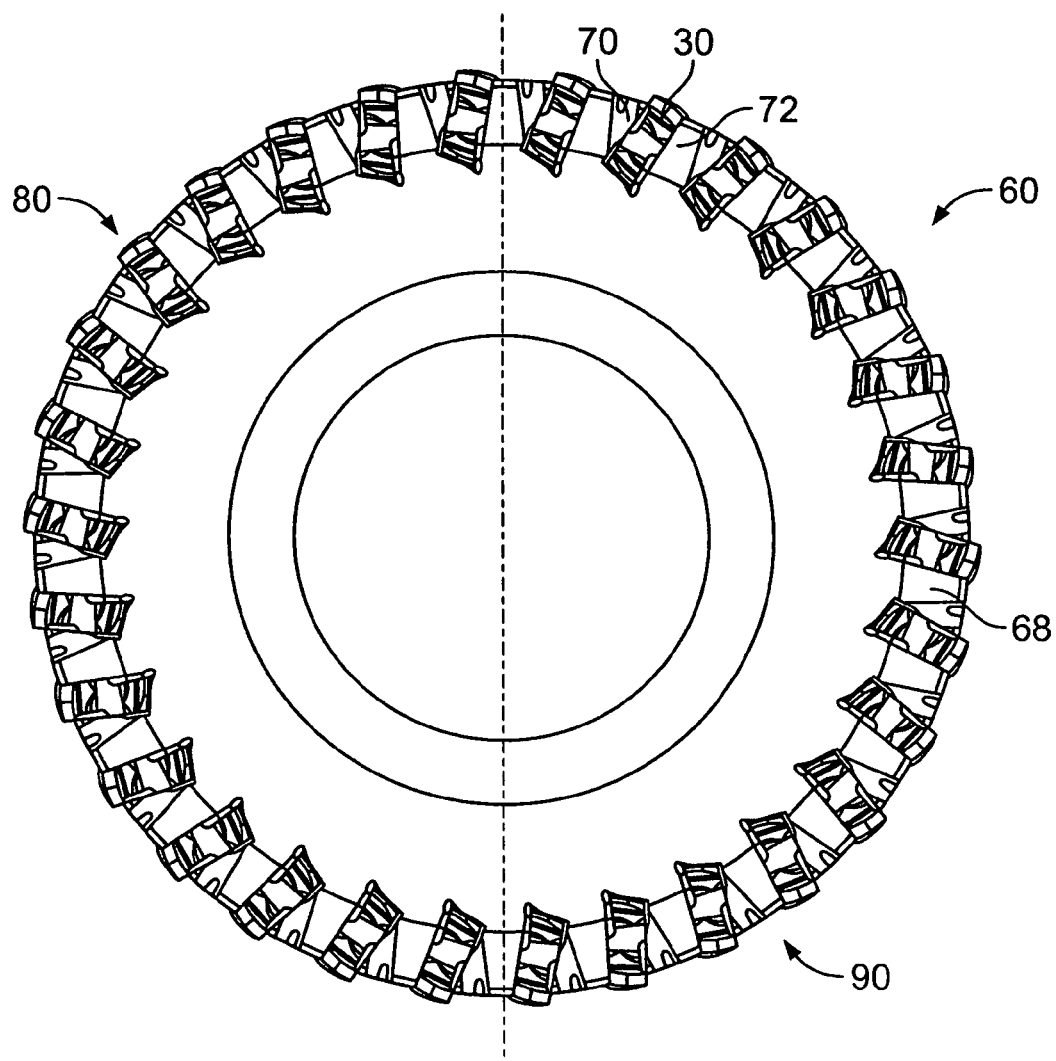
FIG. 14 is a front elevational view of a second embodiment of a cutting tool of the present invention.
Figure 15:
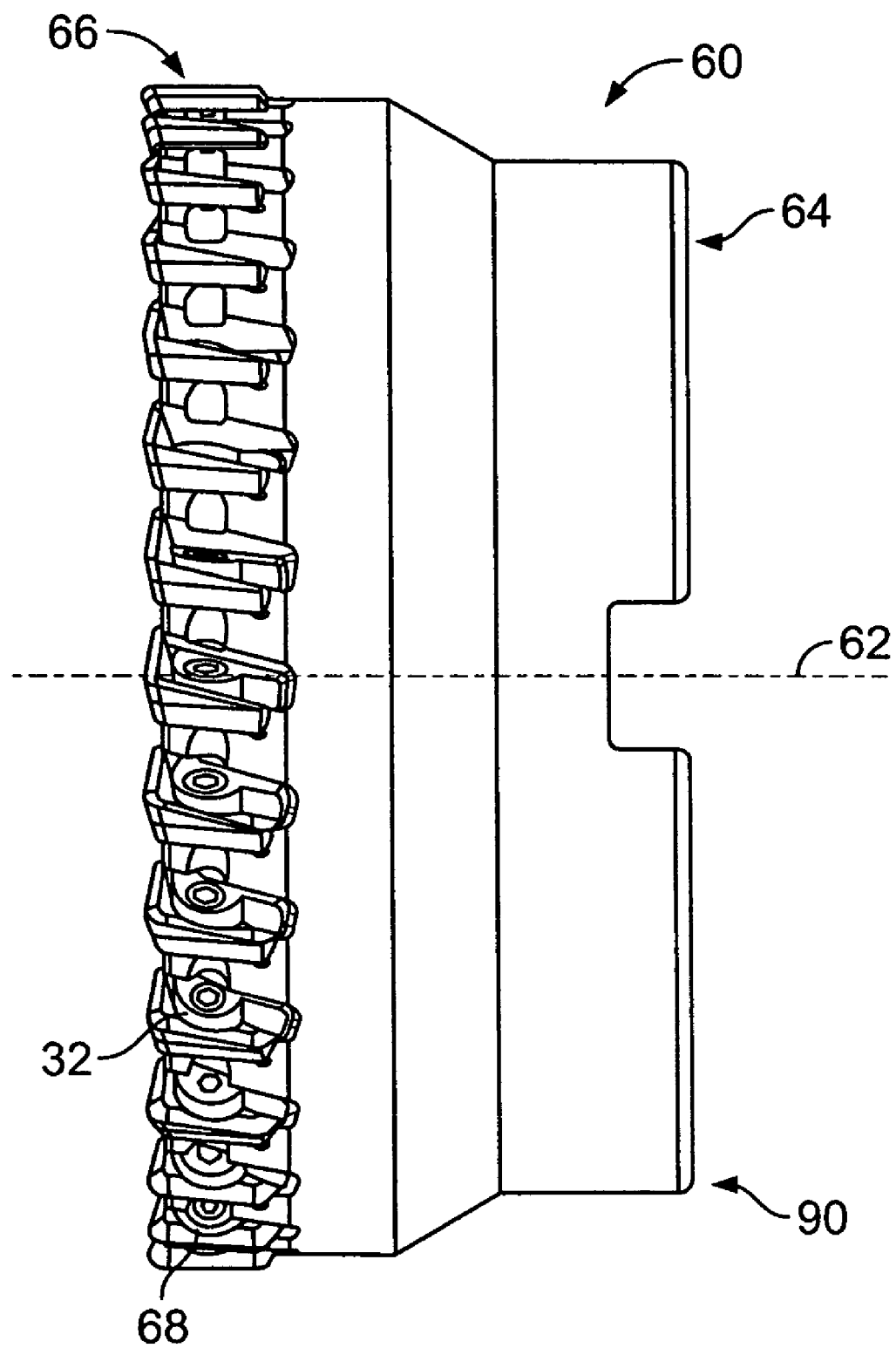
FIG. 15 is a side elevational view of the cutting tool shown in FIG. 14.

The inserts 30 and 130 described above (both positive and negative geometry embodiments) are designed for use in the cutting tool body 60 of a cutting tool, i.e., a milling machine. A first embodiment of a milling machine employing positive geometry inserts 30 is shown in FIGS. 12 and 13, and a second embodiment is shown in FIGS. 14 and 15. The end mill 80 (FIGS. 12 and 13) and the face mill 90 (FIGS. 14 and 15) each include a tool body 60 and a plurality of inserts 30. As shown in FIGS. 12-15, the cutting tool body 60 is substantially cylindrical with a central axis 62 about which it rotates during operation in a predetermined direction. The tool body 60 includes a coupling end portion 64 and a working end portion 66 that is disposed towards a workpiece during operation of the milling machine. The coupling end portion 64 is designed to engage the drive spindle (not shown) of the milling machine for rotation therewith. During operation, a cutting edge of each insert 30 extends beyond the tool body 60 for cutting the workpiece, and the cutting tool body 60 rotates at a predetermined speed bringing the inserts 30 into cutting engagement with the workpiece. The cutting tool body 60 rotates in a counterclockwise direction in FIGS. 12 and 14.

As shown in FIGS. 12-15, the working end portion 66 includes an outer periphery portion 68 defining a number of circumferentially spaced chip pockets 70 for the removed metal material to be discharged during operation in the form of chips. As shown in FIGS. 12 and 14, the chip pockets 70 are located between adjacent insert seats 72, which are also spaced circumferentially about the outer periphery portion 68 of the cutting tool body 60 and which serve as support surfaces for the inserts 30. Each of the insert seats 72 is designed to position, locate, and secure one of the indexable inserts 30 for performing the cutting operation on the workpiece.

The number of insert seats 72 (and therefore the number of inserts 30) depends on the diameter of the cutting tool body 60 and the size of the insert pocket and chip clearance 70. The end mill 80 shown in FIGS. 12 and 13 has sixteen insert seats 72 disposed about the top of the outer periphery portion 68 of the cutting tool body 60. The face mill 90 shown in FIGS. 14 and 15 has thirty insert seats 72 disposed about the outer periphery portion 68. Generally, a larger number of insert pockets 70 (and therefore inserts 30) per diameter results in a higher population of cutting edges, yielding a tool that has a longer cutting life and greater cutting speed and ability.

Features of the cutting insert 30 and chip pocket 70 are readily seen by comparing them to a conventional geometric insert 10 and conventional chip pocket 22. FIG. 10 shows a conventional geometric insert 10 disposed in a conventional chip pocket 22. As can be seen, the conventional insert 10 is mounted in an insert seat 24 by a retainer screw 26 extending approximately perpendicularly through the center of the insert 10 and approximately perpendicularly through a mounting hole 28 in the insert seat 24.

In FIG. 10, the conventional insert 10 and chip pocket 22 are on the outer periphery of a conventional tool body that is rotating in a counterclockwise direction. During operation, active first cutting edge 18 is employed to remove metal from a workpiece, and in so doing, cutting edge 18 experiences cutting forces acting downwardly and radially inwardly against edge 18. In turn, these cutting forces act against the retainer screw 26 and the insert 10 to tend to cause the insert 10 to "flip over" and be ejected from the insert seat 24. A shear force is thereby exerted against the retainer screw 26, which is the primary mechanism for keeping the insert 10 in the insert seat 24. Also, the unused second cutting edge 19 is exposed in the chip pocket 22 to chips that may damage the second cutting edge 19.

Further, with respect to the conventional chip pocket 22, as shown in FIG. 10, steel is generally removed from the conventional tool body to form the chip pocket 22 and to tap the mounting hole 28. Steel is also removed to allow sufficient room above the insert seat 24 for access to the retainer screw 26 with a screwdriver for loosening or tightening of the retainer screw 26. In conventional tool bodies, the axis of the mounting hole 28 is approximately perpendicular to the supporting seat surface 29 to accommodate the retainer screw 26. This orientation, however, requires that a substantial amount of steel be removed in the conventional chip pocket 22 above the insert seat 24 to tap the mounting hole 28, as can be seen in FIG. 10. The removal of this substantial amount of steel weakens the tool body and limits the number of inserts 10 that may be disposed about the outer periphery of the tool body.

FIG. 11 shows the first embodiment of the insert 30 (with positive geometry) disposed in a chip pocket 70. The insert 30 is mounted in an insert seat 72 by an insert retainer 50, preferably a screw, which prevents insert 30 movement during cutting tool operation. As shown in FIG. 11, the insert seat 72 includes a major seating surface 74 located underneath the insert 30 for supporting the insert 30, and having a mounting hole 76 extending through the major seating surface 74 for receiving the insert retainer 50. As shown in FIG. 11, the retainer 50 extends through the center of the insert 30 and through the mounting hole 76 in a non-perpendicular manner. More specifically, the axis defined by the retainer 50 forms a predetermined acute angle, preferably acute angle β discussed above, with respect to planes defined by the opposed major faces 32 and 132 and major seating surface 74.

As shown in FIG. 11, the insert seat 72 also includes a minor seating surface 78 for locating and positioning the insert 30. The minor seating surface 78 is oriented at an angle such that it is in complementary abutting engagement with a side seating surface 38 or 39 of the insert 30 to assist in locating and retaining the insert 30 in the insert seat 72. More specifically, as can be seen in FIG. 11, the minor seating surface 78 is preferably oriented such that it forms predetermined acute angle β when it intersects with major seating surface 74, the same as the acute angle formed by the intersection of side seating surfaces 38 and 39 with opposed major faces 32 and 132 of the insert 30. Further, a third seating surface is preferably in complementary abutting engagement with the narrow end 36 of the insert 30 so that the insert 30 is preferably supported in the insert seat 72 by three seating surfaces. As shown in FIG. 11, the insert seat 72 also includes a recess 79 to allow the seating of unused cutting edge 45 and to prevent damage to the unused cutting edge 45 during operation of the cutting tool.

In FIG. 11, the insert 30 and chip pocket 70 are on the outer periphery of a tool body 60 that is rotating in a counterclockwise direction. During operation, active first cutting edge 44 experiences cutting forces acting downwardly and radially inwardly against edge 44. The orientation of minor seating surface 78 provides a counteracting downward and radially outward force against second edge surface 39 in response to the cutting forces exerted against first cutting edge 44. In other words, the minor seating surface 78 provides the downward and radially outward force to resist "flipping over" of the insert 30, thereby reducing the shear force exerted against the retainer 50. The force needed to retain the insert 30 in the insert seat 72 is provided primarily by the minor seating surface 78, not the insert retainer 50. The resulting reduction in shear force reduces vibration, applies less torque on the retainer 50, and leads to longer life for the insert retainer 50 and for the insert seat 72.

Further, as shown in FIG. 11, the unused second cutting edge 45 is not exposed to potentially damaging loose chips cut during operation of the cutting tool. When the active first cutting edge 44 is in use, the second cutting edge 45 is essentially retracted from the cutting plane of the active edge. As shown in FIG. 11, the second cutting edge 45 is shielded within or near a corner defined by the intersection of the major seating surface 74 and the minor seating surface 78. The geometry of the insert 30 and chip pocket 70 therefore protects the unused cutting edge 45 of the insert 30, resulting in less damage to the unused edge 45 of insert 30.

As can be seen from FIG. 2, the truncated pie shape, or wedge shape, of the insert 30 also helps to protect the unused second cutting edge portion 45a. More specifically, the pie shape provides clearance between the second cutting edge portion 45a and the workpiece being cut during operation of the cutting tool. Without this clearance, the second cutting edge portion 45a would frictionally engage the workpiece when the insert 30 is cutting a workpiece using the first cutting edge 44 and portion 44a, thereby damaging the second cutting edge portion 45a. The thickness of the truncated pie wedge, i.e., the angle formed by the intersection of side seating surfaces 38 and 39 with the virtual bisecting axis, may vary significantly, so long as it provides sufficient clearance to prevent rubbing of the second cutting edge portion 45a against the workpiece.

The orientation of the chip pocket 70 provides additional advantages over conventional cutting tools. In the chip pocket shown in FIG. 11, the mounting hole 76 in major seating surface 74 is oriented at an angle, which requires that substantially less material be removed to tap the mounting hole 76 and form the insert pocket and chip clearance 70. As shown in FIG. 11, the minor seating surface 78 and underlying seat portion extend into a chip pocket wall 71. The wall 71 is dimensioned such that it extends radially outward at an angle, thereby requiring the removal of less steel from the tool body 60 to form the chip pocket 70. The angling of the retainer hole 48 and the mounting hole 76 permits angled access for a tool, such as a screwdriver, for loosening and tightening insert retainer 50, thereby requiring minimum metal removal from the cutting tool body 60 above the major seating surface 74. Reducing the amount of material that needs to be removed from the tool body 60 increases cross-sectional strength, requiring less machining of the tool body 60.

This reduction in dimension and area of the chip pocket 70 has other advantages. First, it allows the outer periphery portion 68 of the tool body 60 to be designed with more inserts 30 for a given tool diameter. The resulting reduction in the size of the chip pocket 70 allows for higher density of inserts 30 (and therefore cutting edges) in both end mill and face mill applications, as well as other applications, with resulting smoother cutting action and greater metal removal rates. The increase in cutting inserts 30 for a given tool diameter allows higher feed rates due to an increased number of cutting edges per revolution of the tool. Second, the change in dimension reduces the amount of recesses in the cutting tool, thereby increasing the cross-section of the tool body 60 and resulting in a stronger, stiffer cutting tool that is more durable and has a longer useful life.

FIG. 11 shows the first embodiment of the insert 30 disposed in a chip pocket 70, but the second embodiment (as well as other embodiments) of the insert 30 may also be used. The insert seat 72, including minor seating surface 78, can be dimensioned to accommodate the second embodiment. The axis of the retention hole would again be angled in both the insert 30 and insert seat 72 to provide angled access of an insert retainer 50. The used of the angled access provides the advantages described above. In addition, the retainer hole 48 is preferably elongated to accommodate an insert retainer 50 along one of two angled axes, as shown in FIG. 9. As a result, as described above, the insert 30 may employ four cutting edges (not just two): two cutting edges for use with a cutting tool rotating in a clockwise direction and two other cutting edges for use with a cutting tool rotating in a counterclockwise direction.

As should be evident, a number of variations in the cutting tool and inserts are possible. For example, the cutting tool bodies may be fashioned with a variety of cutting diameters and number of inserts. Also, as shown in FIG. 13, the cutting tool may use multiple rows and other arrangements of inserts on the cutting tool. Further, the inserts are not limited for use with the type of machining tools described above or mentioned in the background but may be used in virtually any metal removal operation, also including without limitation, lathe tools, boring bars, slotters, and broach tools. These considerations will be dictated by the nature of the work to be performed.

The foregoing relates to preferred exemplary embodiments of the invention. It is understood that other embodiments and variants are possible which lie within the spirit and scope of the invention as set forth in the following claims.

What is claimed is:

1. An indexable cutting insert comprising:
a generally wedge shaped block body having a narrow end and a broad end;
opposite side surfaces of the block body extending from the narrow end to the broad end;
opposite major surfaces of the block body extending from the narrow end to the broad end;
a first pair of parallel side edges extending from the narrow end to the broad end parallel to each other at junctures between one of the opposite side surfaces and the opposite major surfaces;
a second pair of parallel side edges extending from the narrow end to the broad end parallel to each other at junctures between the other of the opposite side surfaces and the opposite major surfaces;

a first cutting edge formed on one of the first pair of parallel side edges to extend from the narrow end to the broad end at the juncture of the one opposite side surface and one of the opposite major surfaces;

a second cutting edge formed on one of the second pair of parallel side edges to extend from the narrow end to the broad end at the juncture of the other of the opposite side surfaces and the other of the opposite major surfaces so that the first and second cutting edges are diagonally oppositely oriented across the block body from each other; and a bore extending through the block body from one major surface to the other major surface for receiving an insert retainer therethrough.

2. The indexable cutting insert of claim 1 wherein the opposite major surfaces each include a seating surface portion and;

a rake surface portion inclined relative to the seating surface portion.

3. The insert of claim 2 wherein the seating surface portion and the rake surface portion of one of the opposite major surfaces are substantially symmetrical to the seating surface portion and rake surface portion of the other of the opposite major surfaces, the insert being indexable by repositioning the insert from the seating surface portion of the one opposite major surface to the seating surface portion of the other opposite major surface.

4. The insert of claim 2 wherein each opposite side surface is disposed at an acute angle β to the adjacent rake surface portion, each opposite side surface constituting the clearance face of the cutting edge formed with said adjacent rake surface portion.

5. The insert of claim 1 wherein a cross-section of the block body, when viewed from the broad end or narrow end of the insert, is substantially in the shape of a parallelogram.

6. The insert of claim 4 wherein the acute angle β ranges from 1° to 89°.

7. The insert of claim 1 wherein the opposite major surfaces each have a truncated wedge shape.

8. The insert of claim 1 wherein the opposite side surfaces are substantially perpendicular to the opposite major surfaces.

9. The indexable cutting insert of claim 1 wherein the major surfaces each include a seating surface portion and a rake surface portion inclined relative to the seating surface portion and each of the cutting edges extend along the rake surface portion of the corresponding major surface from the narrow end of the block body to the broad end of the block body.

10. The indexable cutting insert of claim 1 wherein the side surfaces each extend at an acute angle relative to the major surfaces with which the side surface has the juncture therebetween at which one of the cutting edges is formed.

11. The indexable cutting insert of claim 10 wherein the bore extending through the body is inclined at substantially the same acute angle relative to the major surfaces as the side surfaces.

12. An indexable cutting insert comprising:

a block having first and second opposed major faces extending from one end of the block to a broader opposite end thereof;

said major faces being defined by at least first and second edge surfaces of the block which diverge from the narrow end of the block to the broader end;

the first major face comprising at least in part a seating surface portion extending inwardly from the first edge surface in parallel to a seating surface portion of the second major face extending inwardly from the second edge surface;

the first major face also including a rake surface portion extending inwardly from the second edge surface and forming therewith a first cutting edge;

the second major face also including a rake surface portion extending inwardly from the first edge surface and forming therewith a second cutting edge;

wherein the broader end of the block is indented between the edge surfaces to cause the rake surface portions and cutting edges to project from the broader end.

13. The insert of claim 12 wherein the broader end of the block intersects the first and second edge surfaces to form first and second corners, respectively, the first and second cutting edges extending about the first and second corners to form first and second cutting edge portions defined by the broader end.

14. An indexable cutting insert comprising:

a block having first and second opposed major faces extending from one end of the block to a broader opposite end thereof;

said major faces being defined by at least first and second edge surfaces of the block which diverge from the narrow end of the block to the broader end;

the first major face comprising at least in part a seating surface portion extending inwardly from the first edge surface in parallel to a seating surface portion of the second major face extending inwardly from the second edge surface;

the first major face also include a rake surface portion extending inwardly from the second edge surface and forming therewith a first cutting edge;

the second major face also include a rake surface portion extending inwardly from the first edge surface and forming therewith a second cutting edge;

wherein the edge surfaces are substantially perpendicular to the opposed major faces, and the block is pierced to receive an insert retainer along two different axes that are not perpendicular to the opposed major faces.

15. The insert of claim 14 wherein each axis forms the same acute angle with respect to planes defined by the seating surface portions of the opposed major faces.

16. The insert of claim 15 wherein the edge surfaces intersect the opposed major faces to form four cutting edges.

17. The insert of claim 1 wherein the bore of the block body is an inclined through bore extending therethrough at an acute angle to the opposite major surfaces for receiving an insert retainer.

18. A cutting tool comprising:

a generally cylindrical cutting tool body having a central axis and adapted to be rotated in a predetermined direction about the axis, the body having a working end with an outer periphery;

a plurality of seats and pockets formed in the tool body and spaced circumferentially about the outer periphery of the working end; and a plurality of cutting inserts that can be mounted in the pockets, each insert comprising a block having first and second opposed major faces extending from one end of the block to a broader opposite end thereof;

said major faces being defined by at least first and second edge surfaces of the block which diverge from the narrow end of the block to the broader end;

the first major face comprising at least in part a seating surface portion extending inwardly from the first edge surface in parallel to a seating surface portion of the second major face extending inwardly from the second edge surface;

the first major face also including a rake surface portion extending inwardly from the second edge surface and forming therewith a first cutting edge;

the second major face also including a rake surface portion extending inwardly from the first edge surface and forming therewith a second cutting edge, wherein each edge surface of each insert is disposed at an acute angle β to the adjacent rake surface portion, each edge surface constituting the clearance face of the cutting edge formed with said adjacent rake surface portion;

wherein a cross-section of each insert, when viewed from the broad end or narrow end of the insert, is substantially in the shape of a parallelogram having acute angle β; and wherein each insert block is pierced to receive an insert retainer at angle β with respect to planes defined by the seating surface portions of the opposed major faces of the insert.

19. A cutting tool comprising:

a generally cylindrical cutting tool body having a central axis and adapted to be rotated in a predetermined direction about the axis, the body having a working end with an outer periphery;

a plurality of seats and pockets formed in the tool body and spaced circumferentially about the outer periphery of the working end; and a plurality of cutting inserts that can be mounted in the pockets, each insert comprising a block having first and second opposed major faces extending from one end of the block to a broader opposite end thereof;

said major faces being defined by at least first and second edge surfaces of the block which diverge from the narrow end of the block to the broader end;

the first major face comprising at least in part a seating surface portion extending inwardly from the first edge surface in parallel to a seating surface portion of the second major face extending inwardly from the second edge surface;

the first major face also including a rake surface portion extending inwardly from the second edge surface and forming therewith a first cutting edge;

the second major face also including a rake surface portion extending inwardly from the first edge surface and forming therewith a second cutting edge;

wherein each insert seat is comprised of a major seating surface and a minor seating surface for locating and positioning an insert, the major seating surface for abutting engagement with a seating surface portion of the insert and the minor seating surface for abutting engagement with an edge surface of the insert; and wherein the major seating surface has a mounting hole for insertion of an insert retainer, the axis of the mounting hole oriented at acute angle β with respect to an axis perpendicular to the major seating surface.

20. The cutting tool of claim 19 wherein each insert seat is further comprised of a third seating surface for locating and positioning the insert, the third seating surface for abutting engagement with the narrow end of the insert.

21. The cutting tool of claim 19 wherein the minor seating surface and major seating surface of each insert seat define planes that form acute angle β, the minor seating surface oriented to exert a force against an edge surface of an insert during rotation of the cutting tool body to retain the insert in the insert seat and to reduce the shear force exerted against an insert retainer.

22. The cutting tool of claim 21 wherein one cutting edge of each insert is disposed adjacent to the minor seating surface and to major seating surface, the minor seating surface and major seating surface shielding the one cutting edge from chips cut from a workpiece during rotation of the tool body.

23. The cutting tool of claim 19 further comprising a plurality of chip pockets spaced circumferentially about the outer periphery of the working end of the tool body, each chip pocket located in front of an insert seat and disposed for the removal of chips discharged during rotation of the cutting tool body.

24. The cutting tool of claim 23 wherein each chip pocket is defined, at least in part, by a wall that extends from the minor seating surface of the insert seat, the wall defining a plane that forms an acute angle when extended to intersect the plane defined by the major seating surface.

25. A cutting tool body for mounting cutting tool inserts thereto, the cutting tool body comprising:

a plurality of seats of the cutting tool body for having the cutting tool inserts secured thereto;

a seating surface of each of the seats to which a cutting tool insert is fastened;

a plurality of inclined bores in the cutting tool body corresponding to the plurality of the seats for securing the cutting tool inserts thereto;

a plurality of overhang wall portions that project over the corresponding seating surfaces; and an opening of each of the bores at the corresponding seating surface that is disposed so that a straight line extending from the bore opening normal to the seating surface intersects the corresponding overhang wall portion with the inclination of the bore allowing an insert securing fastener to be inserted therein without interference from the overhang wall portion.

26. The cutting tool body of claim 25 in combination with the cutting tool inserts wherein the cutting tool inserts have opposite upper and lower major faces and a through bore extending therebetween at an inclined angle relative to the major faces so that the fastener can be inserted through the through bore and received in one of the inclined cutting tool body bores.

27. The combination of claim 26 wherein the major faces each include a seating surface portion having an opening to the corresponding through bore therein so that with one of the seating surface portions of one of the inserts engaged flush against the seating surface of the cutting tool body, the respective bores of the cutting tool body and the insert have substantially the same inclination to be in alignment with one another.

28. A cutting tool comprising:

a cutting tool body;

an indexable cutting insert having opposite surfaces each with a cutting edge extending along one side thereof;

a pocket of the cutting tool body configured for receiving the cutting insert therein;

a seat in the cutting tool body pocket having a flat seating surface for supporting either of the insert surfaces so that with one of the insert surfaces supported by the seat, the cutting edge of the other insert surface is exposed for cutting; and a recess in the pocket arranged to form a recessed opening adjacent the flat seating surface and sized for receiving the other cutting edge of the one insert surface with the one insert surface supported by the flat seating surface for protection of the other cutting edge of the one insert surface during cutting with the exposed cutting edge of the other insert surface.

29. The cutting tool of claim 28 wherein the seat includes a corner portion, and the recessed opening is a corner opening at the seat corner portion.

30. The cutting tool of claim 28 wherein the cutting tool body has an overhang wall portion inclined to extend over the seat.

31. The cutting tool of claim 30 wherein the indexable cutting insert has a through bore extending therethrough at an oblique angle relative to the opposite surfaces so as to extend at an incline similar to that of the overhang wall portion to allow a fastener to be received therethrough without interference from the overhang wall portion.

32. The cutting tool of claim 28 wherein the cutting edges are diagonally oppositely oriented across the cutting insert from one another.

33. The cutting tool of claim 28 wherein the opposite surfaces of the cutting insert each include a seating surface portion and a rake surface portion with the seating surface portions being diagonally opposite across the insert from one another and the rake surface portions being diagonally opposite across the insert from one another.

34. The cutting tool of claim 33 wherein the cutting edges extend along the respective rake surface portions of the cutting insert opposite surfaces.

35. The insert of claim 4 wherein the block body is pierced to form the bore to receive an insert retainer at the angle $\beta$ with respect to planes defined by the seating surface portions of the opposite major surfaces.

* * * * *